United States Patent
Rambo

(10) Patent No.: US 8,077,848 B2
(45) Date of Patent: Dec. 13, 2011

(54) METHOD AND SYSTEM FOR 7-DIGIT DIALING IN 10 DIGIT MANDATORY DIALING AREAS

(75) Inventor: Darwin Rambo, Surrey (CA)

(73) Assignee: Broadcom Corporation, Irvine, CA (US)

(*) Notice: Subject to any disclaimer, the term of this patent is extended or adjusted under 35 U.S.C. 154(b) by 2740 days.

(21) Appl. No.: 10/340,022

(22) Filed: Jan. 9, 2003

(65) Prior Publication Data

US 2004/0136514 A1 Jul. 15, 2004

(51) Int. Cl.
*H04M 3/42* (2006.01)
*H04M 7/00* (2006.01)
(52) U.S. Cl. .............. 379/201.01; 379/220.01
(58) Field of Classification Search ............. 379/216.01, 379/220, 355.01, 356.01, 220.01, 112.08, 379/114.01, 201.01
See application file for complete search history.

(56) References Cited

U.S. PATENT DOCUMENTS

| | | | | |
|---|---|---|---|---|
| 4,284,848 A | * | 8/1981 | Frost | 455/465 |
| 5,157,719 A | * | 10/1992 | Waldman | 379/355.05 |
| 5,475,743 A | * | 12/1995 | Nixon et al. | 379/355.07 |
| 5,550,915 A | * | 8/1996 | Partridge, III | 379/355.08 |
| 5,937,055 A | * | 8/1999 | Kaplan | 379/221.14 |
| 6,061,443 A | * | 5/2000 | Yablon | 379/355.08 |
| 7,103,168 B2 | * | 9/2006 | Bedingfield et al. | 379/216.01 |
| 2007/0116249 A1 | * | 5/2007 | Bedingfield et al. | 379/355.05 |
| 2009/0016519 A1 | * | 1/2009 | Bedingfield et al. | 379/216.01 |

* cited by examiner

*Primary Examiner* — Rasha Al Aubaidi
(74) *Attorney, Agent, or Firm* — Thomas Kayden Horstemeyer & Risley, LLP

(57) ABSTRACT

Certain embodiments of the invention provides a method and system for 7-digit dialing in a 10-digit mandatory dialing area. Aspects of the invention may include collecting a dialed string of digits corresponding to a directory number for a dialed call and determining whether an area code should be pre-pended to the collected dialed string of digits. The area code may be transparently pre-pended to a 7-digit dialed directory number if it is determined that the call is for a local area in order to conform with mandatory 10-digit dialing. Otherwise, 10-digits may be collected and used to route the call.

25 Claims, 3 Drawing Sheets

METHOD AND SYSTEM FOR 7-DIGIT DIALING IN 10 DIGIT MANDATORY DIALING AREAS

CROSS-REFERENCE TO RELATED APPLICATIONS/INCORPORATION BY REFERENCE

Not applicable.

BACKGROUND OF THE INVENTION

Certain embodiments of the invention relate to telephony systems. More specifically, certain embodiments of the invention relate to a method and system for 7-digit dialing in 10-digit mandatory dialing areas.

The proliferation of the telephone and telephone related devices such as the facsimile, IP telephones and cellular telephones, has resulted in the exhaustion of directory numbers (DNs) which are assigned to these devices. As the number of telephone subscribers continues to grow, new directory numbers will have to be assigned to these subscribers, and problems associated with directory number exhaustion will be greatly exacerbated.

In general, a directory number may consist of 10 digits, including an area code, an exchange code and a subscriber code. For example, a 10-digit directory number may be represented as XXX-YYY-ZZZZ, where:

XXX represents a 3-digit area code;
YYY represents a 3-digit exchange code; and
ZZZZ represents a 4-digit subscriber code.

Within a particular exchange, the combination of the 3-digit exchange code YYY and the 4-digit subscriber code ZZZZ may uniquely identify a subscriber within the exchange. Within the particular area or region, the combination of the 3-digit area code, the 3-digit exchange code YYY and the 4-digit subscriber code ZZZZ may uniquely identify a subscriber within the area.

In some geographical areas, within a particular exchange, instead of dialing all 10 digits if the directory number, the last seven (7) digits of the directory number may be used to dial a subscriber. This may be especially true in low to moderately populated metropolitan areas. However, in more densely populated regions, due to number exhaustion, it may be mandatory to dial all ten (10) digits of a directory number in order to complete a call to a subscriber. Although mandatory dialing may work fine, some subscribers may find it annoying and unnecessary. This annoyance may be further aggravated in instances where a subscriber may have to dial a plurality of directory numbers.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for 7-digit dialing in a 10-digit mandatory dialing area. The method may include collecting a dialed string of digits corresponding to a directory number for a dialed call and determining whether an area code should be pre-pended to the collected dialed string of digits. If it is determined that the area code should be pre-pended to the collected dialed string of digits, then a local area code may be pre-pended to the dialed string of digits of the directory number. The dialed call may be routed using either the directly dialed string of digits corresponding to the directory number or the pre-pended dialed string of digits corresponding to the directory number.

The determining step may further include deciding if a first three digits of the dialed string of digits is equal to a local area code. If the first three digits of the dialed string of digits is equal to the local area code, then all 10 mandatory digits of the dialed string of digits may be collected and used to route the call. A time period of a timeout timer may be extended to reduce instances of false dialing for the dialed call. A decision may be made as to whether the first three digits of the dialed string of digits is equal to a local exchange code where the first three digits of the dialed string of digits is not equal to the local area code. If the first three digits of the dialed string of digits is equal to the local exchange code, the local area code may be pre-pended to the collected dialed string of digits to create a mandatory 10-digit dialed directory number. All 10-digits of the dialed string of digits may be collected if the first three digits of the dialed string of digits is not equal to the local exchange code. The pre-pending step may be transparent to a subscriber making the dialed call.

Another embodiment of the invention provides, a machine-readable storage, having stored thereon a computer program having at least one code section for providing 7-digit dialing in a 10-digit mandatory dialing area, the at least one code section executable by a machine for causing the machine to perform the steps as described above.

Another aspect of the invention provides a system for 7-digit dialing in a 10-digit mandatory dialing area. The system may include a collector adapted to collect a dialed string of digits corresponding to a directory number for a dialed call and a determinator adapted to determine whether an area code should be pre-pended to the collected dialed string of digits. A pre-pender may be adapted to pre-pend the area code to the dialed string of digits of the directory number if it is determined that the area code should be pre-pended to the collected dialed string of digits. A switch may be adapted to route the dialed call using one of the dialed string of digits corresponding to the directory number and the pre-pended dialed string of digits corresponding to the directory number.

The determinator may further be adapted to decide if a first three digits of the dialed string of digits is equal to a local area code. The collector may be further adapted to collect all 10 mandatory digits of the dialed string of digits if the first three digits of the dialed string of digits is equal to the local area code. A timer having an extended timeout period may be adapted to reduce instances of false dialing for the dialed call. The determinator may be adapted to decide whether the first three digits of the dialed string of digits is equal to a local exchange code, if the first three digits of the dialed string of digits is not equal to the local area code. The pre-pender may be further adapted to pre-pend the local area code to the collected dialed string of digits to create a mandatory 10-digit dialed directory number if the first three digits of the dialed string of digits is equal to the local exchange code. The collector may be further adapted to collect all 10-digits of the dialed string of digits if the first three digits of the dialed string of digits is not equal to the local exchange code. The pre-pender may be adapted to operate transparently to a subscriber making the dialed call.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention provide a method and system for 7-digit dialing in a 10-digit mandatory dialing area. Aspects of the invention may include collecting a dialed string of digits corresponding to a directory number for a dialed call and determining whether an area code should be pre-pended to the collected dialed string of digits. The area code may be transparently pre-pended to a 7-digit dialed directory number if it is determined that the call is for a local area in order to conform with mandatory 10-digit dialing. Otherwise, 10-digits may be collected and used to route the call.

In an embodiment of the invention, a smart dialing string recognition methodology may be provided. The smart dialing string recognition methodology may be adapted to analyze dialed digits corresponding to a dialed directory number (DN). Accordingly, the digits of the directory number as dialed may be directly used to complete a call or an area code may be pre-pended to the dialed digits and a directory number formed with the pre-pended dialed digits used to complete the call.

Figure 1:
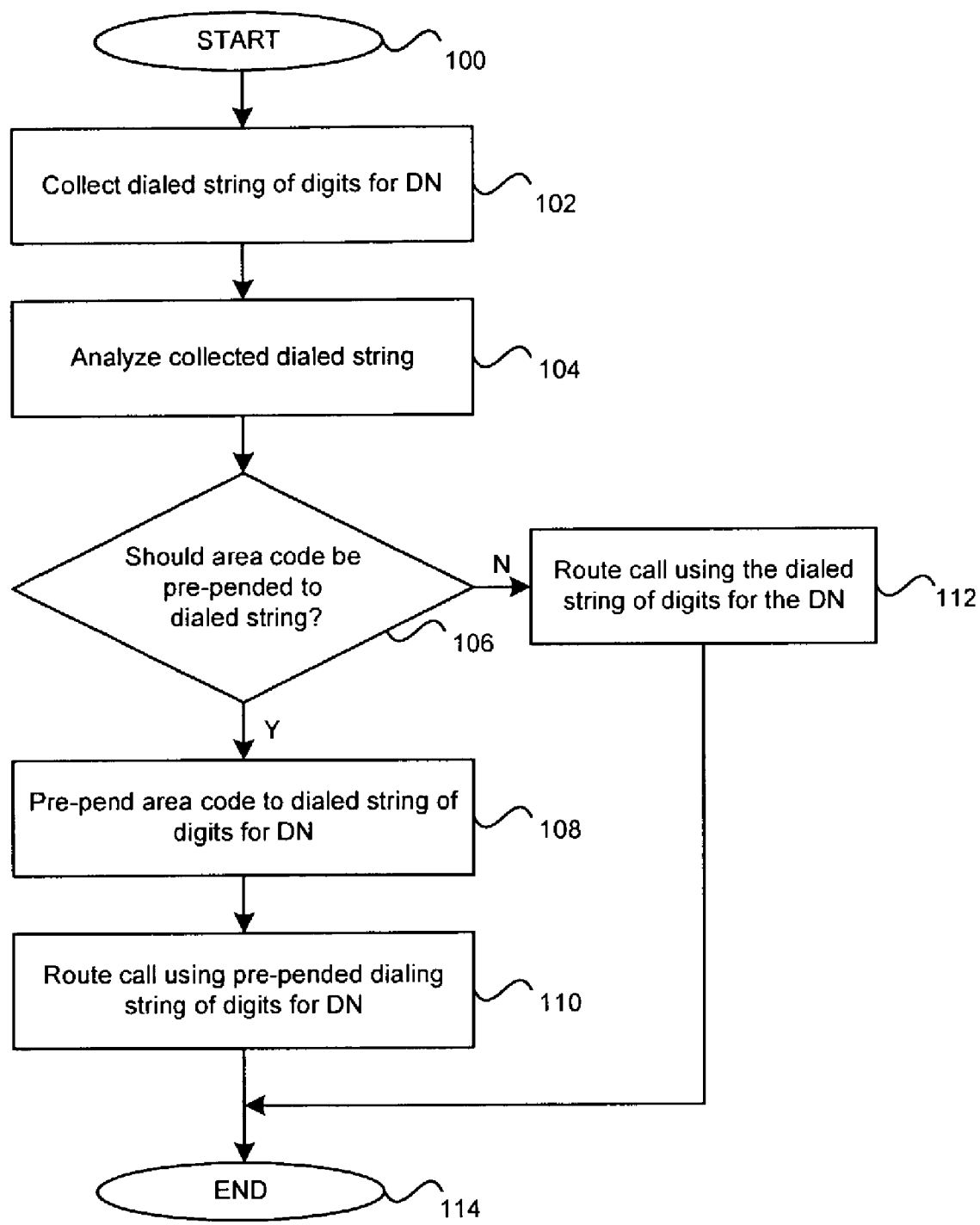
FIG. 1 is a high level flow chart illustrating exemplary steps that may be utilized for 7-digit dialing in 10-digit mandatory dialing areas in accordance with an embodiment of the invention.

FIG. 1 is a high level flow chart illustrating exemplary steps that may be utilized for 7-digit dialing in 10-digit mandatory dialing areas in accordance with an embodiment of the invention. Referring to FIG. 1, the exemplary steps may start at step 100. In step 102, the dialed string of digits corresponding to the dialed directory number for a call may be collected. In step 104, the dialed string of digits for the directory number may be analyzed. In step 106, a decision may be made as to whether an area code should be pre-pended to the dialed string of digits for the directory number. If it is determined that an area code should be pre-pended to the dialed string of digits for the directory number, then in step 108, an area code may be pre-pended to the dialed string of digits. Subsequently, in step 110, the call may be routed using the pre-pended dialed string of digits for the directory number. The steps may then end at step 114. Returning to step 106, if during the decision it is determined that an area code should not be pre-pended to the dialed string of digits, then in step 112, the call may be routed using the dialed string of digits.

Figure 2:
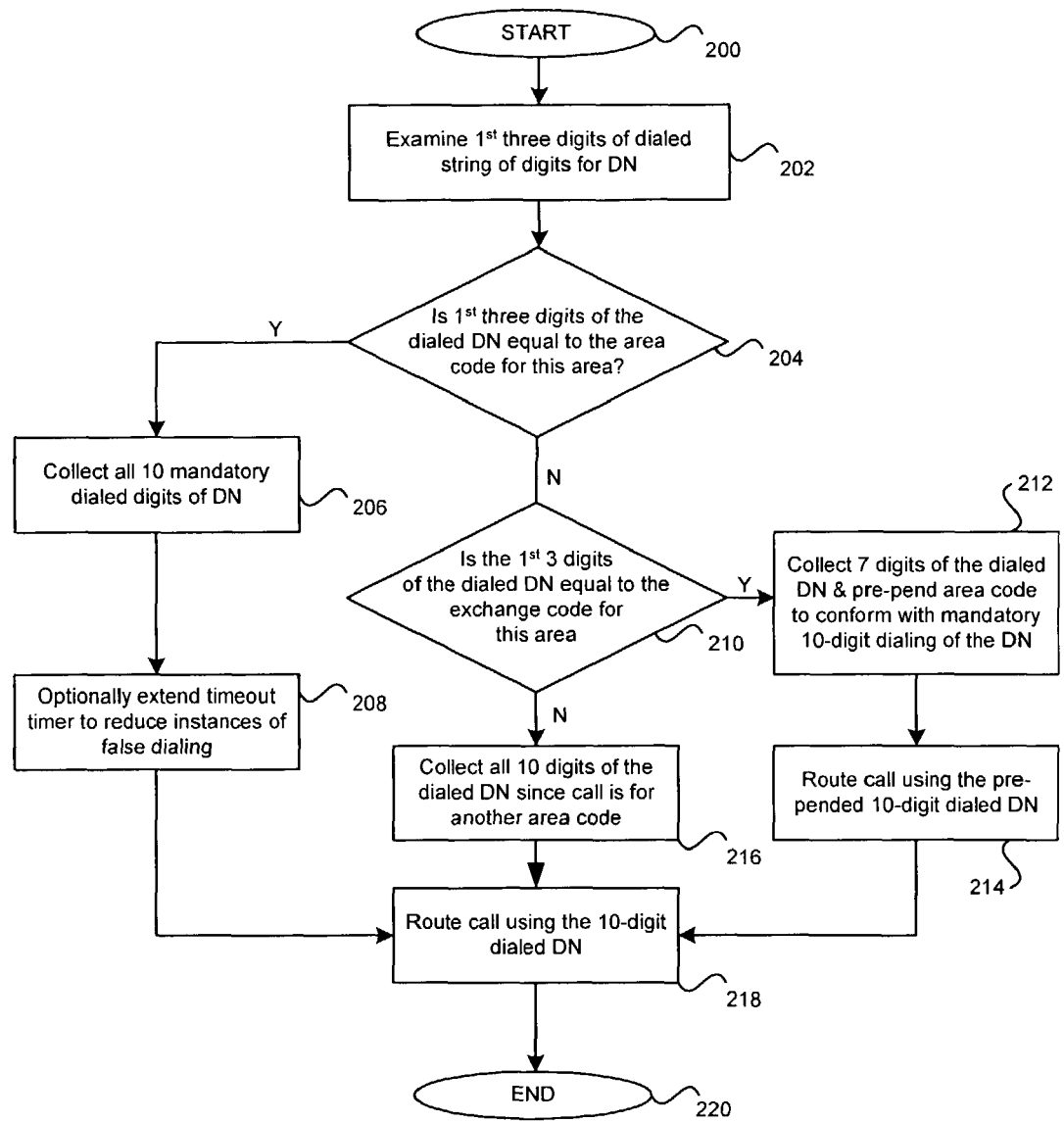
FIG. 2 is a flow chart illustrating exemplary steps that may be utilized by the steps of FIG. 1 in accordance with an embodiment of the invention.

FIG. 2 is a flow chart illustrating exemplary steps that may be utilized by the steps of FIG. 1 in accordance with an embodiment of the invention. Referring to FIG. 2, the exemplary steps may start at step 200. In step 202, the first three (3) digits of the dialed string of the digits comprising the directory number may be examined. In step 204, a decision may be made as to whether the first three (3) digits of the dialed directory number are equal to the area code for this local area. If the first three (3) digits of the dialed directory number are equal to the area code for this local area, then in step 206, all ten (10) mandatory dialed digits for the directory number may be collected. Optionally, in step 208, a period for a timeout timer used for collection of the dialed digits of the directory number may be extended. The extension of the timeout timer period may reduce any instances of false dialing while the dialed digits are being collected. Subsequently, in step 218, the call may be routed to its destination using the ten (10) digits of the dialed directory number.

Returning to step 204, if the first three (3) digits of the dialed directory number are not equal to the area code for this local area, then in step 210, a decision may be made as to whether the first three (3) digits of the dialed directory number is equivalent to the exchange code for this local area. If the first three (3) digits of the dialed directory number is equivalent to the exchange code for this area, then in step 212, the seven digits of the dialed directory number may be collected and the area code pre-pended to 7-digit dialed directory number to conform to the mandatory 10-digit dialing of the directory number. In step 214, the call may be routed using the pre-pended 10-digit directory number. Subsequent to step 214, the steps may end with step 220.

Returning to step 210, if the first three (3) digits of the dialed directory number is not equivalent to the exchange code for this area, then in step 216, all ten (10) digits of the dialed directory number may be collected since the call may be destined for another area code. Subsequently, in step 218 the call may be routed to its destination using the ten (10) digits of the dialed directory number. Subsequent to step 218, the steps may end at step 220.

In accordance with an aspect of the invention, the 7-digit dialing in mandatory 10-digit calling areas may be added as an optional feature that may be enabled or disabled. In a case where the option may be enabled, then after collecting the first seven (7) digits of a dialed directory number, a timer may be started after the seventh digit is collected. If after a timeout period has elapsed, and/or there is a reasonable inter-digit interval or spacing, a timeout may occur and the area code for the specified area may be pre-pended to the seven (7) digits of the dialed directory number. Accordingly, to reduce latency, the mandatory ten (10) digits comprising the directory number to be dialed may be rapidly sent to a switching element such as a switch or softswitch. In another aspect of the invention, the pre-pending of the area code to a dialed directory number may be transparent to a dialing subscriber.

In accordance with another aspect of the invention, the timeout period after the seventh digit is dialed may be fixed or adaptive. The fixed timeout period or delay may be predetermined and may be for example, a few milliseconds (ms). In this regard, after the specified predetermined timeout period has elapsed, a timeout may occur and the collected digits of the directory number used to route or complete the call. The specified predetermined period may be established at runtime and/or compile time. The adaptive timeout period or delay may be based on for example, one or a plurality of prior dialed calls. In one aspect of the invention, to determine an appropriate adaptive timeout period or delay, a mean and/or peak interdigit time interval may be determined for a plurality of dialed calls and a reasonable delay period extrapolated based on prior interdigit time intervals and distribution.

Although the invention may permit faster dialing times and provide less aggravation and effort in completing a local call, a subscriber may still have the ability to make, for example, long distance calls without any impairment. In this regard, 7-digit dialing in mandatory 10-digit dialing areas may coexist with existing telephony features. In cases where subscribers previously have the capability to dial local calls using seven (7) digits and were mandated to use 10-digit dialing, the invention provides a means for restoring 7-digit dialing without impairing the mandatory calling requirements. Accordingly, in certain instances, subscribers may not have to learn new area codes.

The invention may be applicable to private branch exchange systems (PBXs), key systems, plain old telephone systems (POTS), and digital telephony systems such as IP telephony systems. As an illustration, in corporate environments, PBXs may utilize 7-digit dialing where an area code may be pre-pended to dialed digits of a directory number in order to meet mandatory 10-digit dialing. For example, for local calls outside the PBX, the local area code may be pre-pended to the dialed 7-digits of a directory number. Although the invention utilizes 10-digit mandatory dialing for illustrative purposes, the invention is not so limited. Accordingly, it should be recognized that the present invention may be utilized in regions that may require more or less than ten (10) digits for mandatory dialing, without departing from the spirit of the invention.

Figure 3:
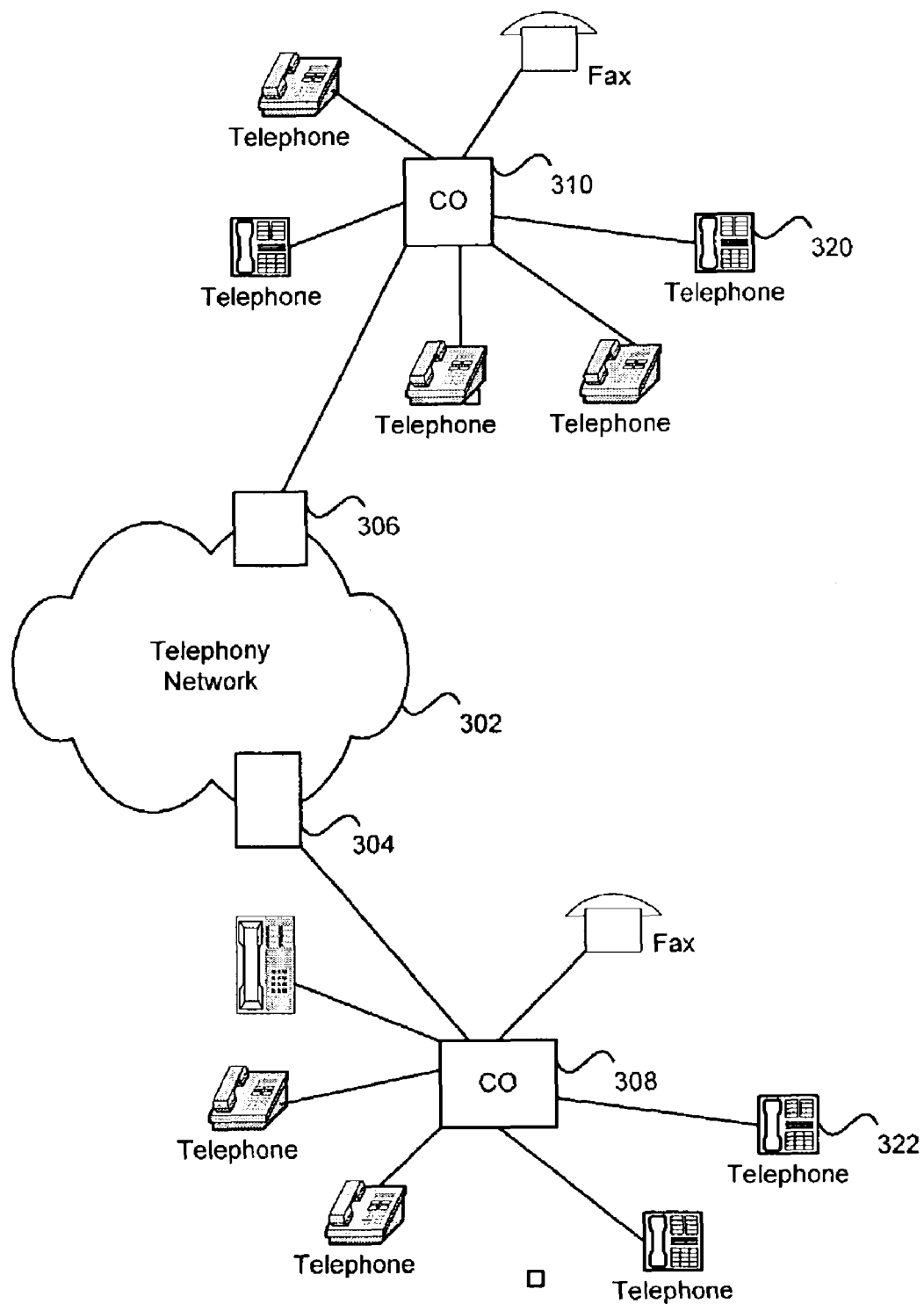
FIG. 3. is a block diagram of an exemplary system that may be utilized for 7-digit dialing in 10-digit mandatory dialing areas in accordance with an embodiment of the invention.

FIG. 3. is a block diagram of an exemplary system that may be utilized for 7-digit dialing in 10-digit mandatory dialing areas in accordance with an embodiment of the invention. Referring to FIG. 3, there is shown a telephony network 302, network edge devices 304, 306 and central offices 308, 310. The telephony network 302 may include suitable transmission and switching equipment that may be adapted to route calls throughout the network. The telephony network 302 may be adapted to transport and/or route packet switched and/or circuit switched data. The central offices 308, 310 may be coupled to the telephone network 302 and provide local access service to subscriber devices such as telephones and facsimiles, which may be coupled thereto. The central offices 308, 310 may be adapted to handle packet switched and/or circuit switched data. The network edge devices 304, 306 and the central offices 308, 310 may include the capabilities of a switch, a gateway or a combination thereof and may have the capability to handle packet switched and/or circuit switched data.

Central office 310 may provide service to telephone 322, and central office 308 may provide local access service to telephone 322. In operation, a call originating at a subscriber device 320 and may be handled by a central office 310, which may supply signaling information to switch 306. Switch 306 may route the call to switch 304. Switch 304 may subsequently route the call to central office 308, the latter of which may connect the call to telephone 322. The switches or telephony equipment located in the central offices 308, 310 may include suitable processors and/or switching elements that may be adapted for processing information corresponding to inbound and outbound calls. For example, the central offices 308, 310 may include one or more processors and/or processing elements that may be adapted to receive, and process dialed digits, signaling information, voice and data. In this regard, suitable circuits and/or software may be provided at the central offices 308, 310 to process call information, which may include determining whether an area code or dialing prefix should be pre-pended to a directory number or a portion thereof.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for 7-digit dialing in a 10-digit mandatory dialing area, the method comprising:
   collecting, within the 10-digit mandatory dialing area, a dialed string of digits corresponding to a directory number for a dialed call;
   determining whether an area code should be pre-pended to said collected dialed string of digits by examining the first three digits in said dialed string of digits;
   pre-pending said area code to said dialed string of digits of the directory number if it is determined that said area code should be pre-pended to said collected dialed string of digits; and
   routing said dialed call using one of said dialed string of digits corresponding to said directory number and said pre-pended dialed string of digits corresponding to said directory number.

2. The method according to claim 1, wherein said determining comprises deciding if a first three digits of said dialed string of digits is equal to a local area code.

3. The method according to claim 2, comprising collecting all 10 mandatory digits of said dialed string of digits if said first three digits of said dialed string of digits is equal to said local area code.

4. The method according to claim 3, comprising extending a timeout timer period to reduce instances of false dialing for said dialed call.

5. The method according to claim 3, comprising deciding if said first three digits of said dialed string of digits is equal to a local exchange code if said first three digits of said dialed string of digits is not equal to said local area code.

6. The method according to claim 5, comprising pre-pending said local area code to said collected dialed string of digits to create a mandatory 10-digit dialed directory number if said first three digits of said dialed string of digits is equal to said local exchange code.

7. The method according to claim 5, comprising collecting all 10-digits of said dialed string of digits if said first three digits of said dialed string of digits is not equal to said local exchange code.

8. The method according to claim 1, wherein said pre-pending is transparent to a subscriber making said dialed call.

9. A machine-readable storage, having stored thereon a computer program having at least one code section for providing 7-digit dialing in a 10-digit mandatory dialing area, the at least one code section executable by a machine for causing the machine to perform the steps comprising:

collecting, within the 10-digit mandatory dialing area, a dialed string of digits corresponding to a directory number for a dialed call;

determining whether an area code should be pre-pended to said collected dialed string of digits by examining the first three digits in said dialed string of digits;

pre-pending said area code to said dialed string of digits of the directory number if it is determined that said area code should be pre-pended to said collected dialed string of digits; and routing said dialed call using one of said dialed string of digits corresponding to said directory number and said pre-pended dialed string of digits corresponding to said directory number.

10. The machine-readable storage according to claim 9, wherein said at least one determining code section comprises code for deciding if a first three digits of said dialed string of digits is equal to a local area code.

11. The machine-readable storage according to claim 10, comprising code for collecting all 10 mandatory digits of said dialed string of digits if said first three digits of said dialed string of digits is equal to said local area code.

12. The machine-readable storage according to claim 11, comprising code for extending a timeout timer period to reduce instances of false dialing for said dialed call.

13. The machine-readable storage according to claim 11, comprising code for deciding if said first three digits of said dialed string of digits is equal to a local exchange code if said first three digits of said dialed string of digits is not equal to said local area code.

14. The machine-readable storage according to claim 13, comprising code for pre-pending said local area code to said collected dialed string of digits to create a mandatory 10-digit dialed directory number if said first three digits of said dialed string of digits is equal to said local exchange code.

15. The machine-readable storage according to claim 13, comprising code for collecting all 10-digits of said dialed string of digits if said first three digits of said dialed string of digits is not equal to said local exchange code.

16. The machine-readable storage according to claim 9, wherein said pre-pending is transparent to a subscriber making said dialed call.

17. A system for 7-digit dialing in a 10-digit mandatory dialing area, the system comprising:

at least one processor operable to:
collect within the 10-digit mandatory dialing area, a dialed string of digits corresponding to a directory number for a dialed call;
determine whether an area code should be pre-pended to said collected dialed string of digits by examining the first three digits in said dialed string of digits; and
pre-pend said area code to said dialed string of digits of the directory number if it is determined that said area code should be pre-pended to said collected dialed string of digits; and a switch operable to route said dialed call using one of said dialed string of digits corresponding to said directory number and said pre-pended dialed string of digits corresponding to said directory number.

18. The system according to claim 17, wherein said at least one processor comprises:

a collector operable to collect a dialed string of digits corresponding to a directory number for a dialed call;

a determinator operable to determine whether an area code should be pre-pended to said collected dialed string of digits; and a pre-pender operable to pre-pend said area code to said dialed string of digits of the directory number if it is determined that said area code should be pre-pended to said collected dialed string of digits.

19. The system according to claim 18, wherein said determinator is further operable to decide if a first three digits of said dialed string of digits is equal to a local area code.

20. The system according to claim 19, wherein said collector is further operable to collect all 10 mandatory digits of said dialed string of digits if said first three digits of said dialed string of digits is equal to said local area code.

21. The system according to claim 20, comprising a timer having an extended timeout period to reduce instances of false dialing for said dialed call.

22. The system according to claim 20, wherein said determinator is operable to decide whether said first three digits of said dialed string of digits is equal to a local exchange code, if said first three digits of said dialed string of digits is not equal to said local area code.

23. The system according to claim 22, wherein said pre-pender is further operable to pre-pend said local area code to said collected dialed string of digits to create a mandatory 10-digit dialed directory number if said first three digits of said dialed string of digits is equal to said local exchange code.

24. The system according to claim 22, wherein said collector is further operable to collect all 10-digits of said dialed string of digits if said first three digits of said dialed string of digits is not equal to said local exchange code.

25. The system according to claim 18, wherein said pre-pender operates transparent to a subscriber making said dialed call.

* * * * *